E. L. Walker

Hay Fork.

No. 2429 Reissued Dec. 18, 1866.

Witnesses.
C. L. Topliff
Henry Morris

Inventor.
E. L. Walker
By Munn & Co
Attys

United States Patent Office.

IMPROVEMENT IN HAY ELEVATORS.

EDWARD L. WALKER, OF BENFORD'S STORE, PENNSYLVANIA.

*Letters Patent No.* 44,129, *dated September* 6, 1864; *reissue No.* 2,429, *dated December* 18, 1866.

The Schedule referred to in these Letters Patent and making part of the same.

TO ALL WHOM IT MAY CONCERN:

Be it known that I, EDWARD L. WALKER, of Benford's Store, in the county of Somerset, and State of Pennsylvania, have invented a new and improved Hay Elevator; and I do hereby declare that the following is a full, clear, and exact description thereof, which will enable others skilled in the arts to make and use the same, reference being had to the accompanying drawing, forming part of this specification, wherein—

Similar letters of reference indicate like parts.

My invention relates to an apparatus for penetrating hay or similar material, and raising the same by power for transfer from a cart to the mow, or the reverse, and then discharging the hay from said apparatus when the same reaches the desired place. My invention consists in an instrument that can be thrust into the hay or similar material, in combination with a barb or prong acting below such material to cause it to be elevated with the instrument, and with a disconnecting apparatus operated by a cord or rope, to effect the removal or release of such barb or prong, and the discharge of the hay or similar material.

Figure 1:
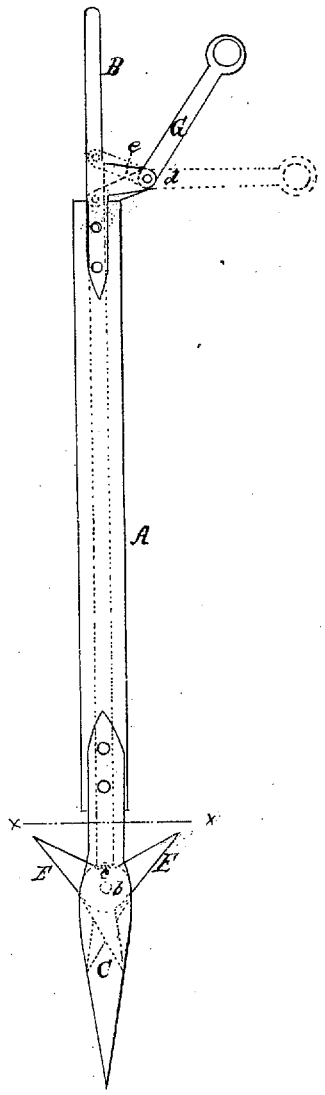
Figures 1 and 2 are external views of my invention.
Figure 2:
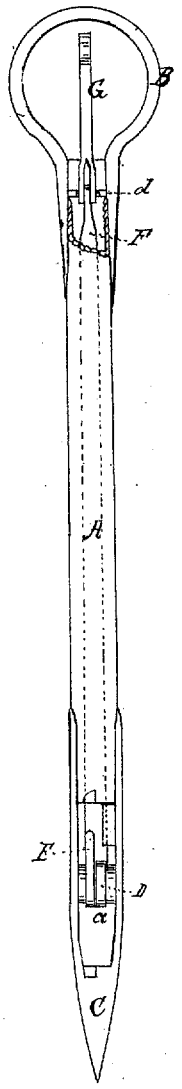
Figure 3:
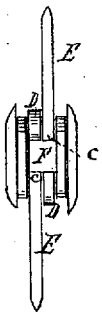
Figure 3 is a horizontal section of the same taken in the line *x x*, fig. 1.

A represents a tubular rod or shaft, having an eye, B, secured to its upper end, and a pointed head, C, bolted or otherwise secured to its lower end, so that it may enter and be readily forced into the hay or similar material. This head, C, has a slot or opening, *a*, made entirely through it, across which is a rod or shaft *b*, receiving loosely two circular plates D D, each of which is provided with a barb or pointed projection E, which, when distended, project outward from opposite sides of the head C, and incline a little upward, as shown in fig. 1. Within the tubular rod or shaft A there is fitted a rod, F, the lower end of which when pressed down enters recesses *c*, in the plates D D, and holds them in the position indicated in fig. 1. To the upper end of the rod F there is attached a lever, G, the fulcrum pin, *d*, of which passes through an arm, *e*, attached to the tubular rod or shaft A. The hoisting rope is connected with the eye B, at the upper end of the rod A, said rope being arranged in the usual way. In using this implement the bar F is to be drawn up into the position shown in red lines in fig. 1, and the instrument thrust into the hay or similar material, which operation causes the barbs E to be turned up with their upper ends adjacent to the lower end of the rod F; said rod F is then forced down by the lever G, and spreads said barbs E so that they take beneath and lift the hay, the notches *c*, in the plates D, taking the sides of the lower end of F, and sustaining the barbs E and the hay until the rod F is raised by the lever G, and the barbs are liberated and close into the position shown by red lines in fig. 1, allowing the hay or other material to be discharged.

I am aware that harpoons and similar instruments have been made for penetrating an article to be held or raised by a barb or barbs projecting from the sides of such instrument, but in such cases there has not been any device for withdrawing or relieving the barb or barbs from their hold upon the article penetrated, so as to discharge the same at pleasure.

What I claim as my invention, and desire to secure by Letters Patent, is—

1. The combination, in a fork for elevating hay or similar material, of the following devices: first, a shaft for penetrating such material; second, a barb or barbs for sustaining the material while being elevated; and third, a device for relieving the barb or barbs for discharging the material, substantially as set forth.

2. I claim a penetrator in combination with one or more sustaining prongs or barbs, and a discharging device, substantially as specified, for raising and discharging hay or similar material, substantially as set forth.

3. I claim the barbs E E, arranged substantially as specified, in combination with the rod F, for sustaining said barbs, as set forth.

In witness whereof I have hereunto set my signature this thirteenth day of October, A. D. 1866.

E. L. WALKER.

Witnesses:

PETER MESICK,

J. H. GRAHAM.